United States Patent [19]

Pittet et al.

[11] 4,055,506

[45] * Oct. 25, 1977

[54] NOVEL FRAGRANCE COMPOSITIONS AND PERFUMED ARTICLES CONTAINING ALPHA-SUBSTITUTED ACETALDEHYDE

[75] Inventors: Alan Owen Pittet, Atlantic Highlands; Erich Manfred Klaiber, Neptune; Manfred Hugo Vock, Locust, all of N.J.; Edward J. Shuster, Brooklyn, N.Y.; Joaquin Vinals, Red Bank, N.J.

[73] Assignee: International Flavors & Fragrances Inc., New York, N.Y.

[*] Notice: The portion of the term of this patent subsequent to Feb. 24, 1993, has been disclaimed.

[21] Appl. No.: 740,949

[22] Filed: Nov. 11, 1976

Related U.S. Application Data

[60] Division of Ser. No. 598,805, July 24, 1975, Pat. No. 4,026,824, which is a continuation-in-part of Ser. No. 507,412, Sept. 19, 1974, Pat. No. 3,940,499.

[51] Int. Cl.$^2$ .............................................. C11D 9/44
[52] U.S. Cl. ..................................... 252/132; 252/522
[58] Field of Search ...................... 252/89 R, 522, 132, 252/108; 260/598

[56] References Cited

U.S. PATENT DOCUMENTS

| 3,940,499 | 2/1976 | Pittet et al. | 252/522 X |
| 3,989,760 | 11/1976 | Light et al. | 252/132 X |

Primary Examiner—Harris A. Pitlick
Attorney, Agent, or Firm—Arthur L. Liberman; Franklin D. Wolffe

[57] ABSTRACT

Processes and compositions are described for the use in perfume aroma imparting, augmenting, modifying, altering or enhancing compositions and as perfume and perfumed article aroma imparting, modifying, altering and enhancing materials of 2,2,6-trimethyl-1-cyclohexene-1-ylacetaldehyde (hereinafter referred to as "beta-cyclohomocitral") produced by a process which either (A) comprises the steps of:
i. Oxidizing beta-ionone having the formula:

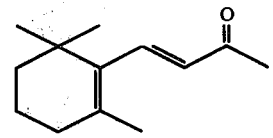

with a peralkanoic acid having the formula:

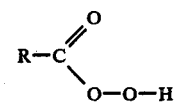

(wherein R is H, methyl or ethyl) in the presence of buffer and in the absence of dimethyl formamide, to form 2,2,6-trimethyl-1-cyclohexene-1-ylvinylacetate (hereinafter referred to as "beta-ionone enol ester") having the formula:

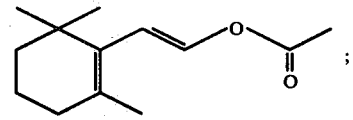

and
ii. Hydrolyzing said beta-ionone enol ester using a basic hydrolysis agent to form beta-cyclo-homocitral having the structure:

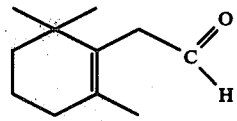

or (B) oxidizing beta-ionone with hydrogen peroxide in the presence of inorganic base to form beta-cyclohomocitral, directly. Addition of beta-cyclohomocitral is indicated to produce in perfumes, woody, camphoraceous, green, earthy and rosey notes, or enhance in perfume compositions and perfumed articles, floral (especially rosey) notes.

3 Claims, No Drawings

NOVEL FRAGRANCE COMPOSITIONS AND PERFUMED ARTICLES CONTAINING ALPHA-SUBSTITUTED ACETALDEHYDE

This application is a division of U.S. Application for Letters Pat. Ser. No. 598,805, filed July 24, 1975 now U.S. Pat. No. 4,026,824, issued on May 31, 1977, which, in turn, is a continuation-in-part of U.S. application for Letters Pat. Ser. No. 507,412, filed on Sept. 19, 1974 (now U.S. Pat. No. 3,940,499, issued Feb. 24, 1976).

BACKGROUND OF THE INVENTION

The present invention relates to 2,2,6-trimethyl-1-cyclohexene-1-ylacetaldehyde (or "beta-cyclohomocitral") produced by, interalia, a novel process described and claimed in copending Applications for U.S. Letters Pat. No. 507,414, filed on Sept. 19, 1974 (now U.S. Pat. No. 3,956,393, issued on May 11, 1976), and U.S. Pat. No. 594,100, filed on July 8, 1975 (now U.S. Pat. No. 3,980,708, issued on Sept. 14, 1976) and novel compositions using such beta-cyclohomocitral to alter, modify, enhance the aroma of a perfumed composition or a perfumed article or enhance the aroma of a perfumed composition or perfumed article.

There has been considerable work performed relating to substances which can be used to impart, modify, alter or enhance fragrances to (or in) various consumable materials such as perfumed compositions and perfumed articles such as soaps, colognes and detergents. These substances are used to diminish the use of natural materials, some of which may be in short supply and/or to provide more uniform properties in the finished product. Woody, camphoraceous, green, rosey, floral and earthy notes are desirable in several types of perfumed compositions and perfumed articles.

Arctander, "Perfume and Flavor Chemicals," 1969 discloses the use in perfume compositions and flavors of "cyclocitral," "dehydro-beta-cyclocitral," "isocyclocitral," "alpha-cyclocitrylidene acetaldehyde" and "beta cyclotrylidene acetaldehyde," thus:

i. ""760" CYCLOCITRAL Alpha-cyclocitral = (2,2,6-trimethyl-5-cyclohexen-1-carboxaldehyde). beta-cyclocitral = (2,2,6-trimethyl-6-cyclohexen-1-carboxaldehyde). Both isomers are known and have been produced separately.

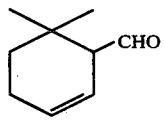 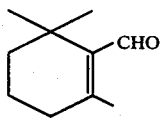

Very rarely offered commercially. These particular cyclocitrals have little or no interest to the creative perfumer, but they have served as part of many pieces of proof that isomers (alpha-beta) do often have different odors."

ii. "761: iso-CYCLOCITRAL A mixture of two chemicals: 3,5,6-trimethyl-3-cyclohexen-1-carboxaldehyde (meta-cyclocitral).

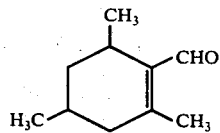

(corrected structure)

2,4,6-trimethyl-4-cyclohexen-1-carboxaldehyde (symmetric-iso-cyclocitral).

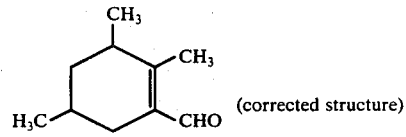

(corrected structure)

Powerful, and diffusive, foliage-green, "dark" weedy and dry odor, sometimes described as "Flower-shop odor." The earthy and wet-green notes are quite natural in high dilution and resemble the odor of stems from plants and flowers fresh from the soil.

Finds use in perfume compositions where it blends excellently with Oakmoss products (compensates from sweetness and lifts the topnote), with Inonoes (freshness), Geranium "vegetable" notes), etc. ...."

iii. "762: alpha CYCLOCITRYLIDENE ACETALDEHYDE

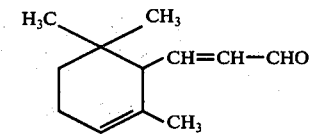

Mild, floral-woody, somewhat oily-herbaceous odor, remotely reminiscent of Rose with similarity to the odor of hydrogenated Ionones.

Suggested for use in perfume compositions. It brings a certain amount of floral lift to Rose compositions, and performs fairly well even in soap. However, the cost of the rarely offered and never readily available lots are rather discouraging to the perfumer, and it is most conceivable that this material can be left out of the perfumer's library without any great loss. ...."

iv. "763: beta-CYCLOCITRYLIDENE ACETALDEHYDE  2,6,6-trimethyl-1-cyclohexenyl-beta-acrolein.

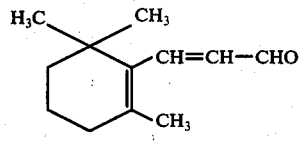

Sweet-woody, rather heavy odor, resembling that of beta-Ionone. More fruity than really floral, but not as tenacious as the Ionone. Suggested for use in perfume compositions, but since it does not offer any new or unusual odor characteristics, and it cannot be produced in economical competition to beta-Ionone, there is little or no chance that it will ever become a standard shelf ingredient for the perfumer. ...."

v. "869: DEHYDRO-beta-CYCLOCITRAL (Safranal)  2,6,6-trimethyl-4,4-cyclohexadiene-1-carboxaldehyde

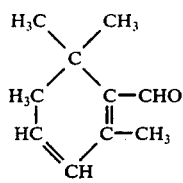

Very powerful, sweet, green-floral and somewhat tobacco-herbaceous odor of good tenacity. In extreme dilution reminiscent of the odor of Safran (Saffron).

Interesting material for fresh topnotes, as a modifier for aldehydic-citrusy notes, as a green-floral topnote in flower fragrances, etc. It blends excellently with the aliphatic Aldehydes, with Oakmoss products and herbaceous oils. ..."

Safranal and beta-cyclocitral are disclosed as volatile constituents of Greek Tobacco by Kimland et al,. Phytochemistry 11 (309) 1972. Beta-cyclocitral is disclosed as a component of Burley Tobacco flavor by Demole and Berthet, Helv. Chim. Acta. 55 Fasc-6, 1866 (1972).

THE INVENTION

It has now been discovered that novel perfume compositions and perfumed articles having woody, camphoraceous, green, earthy, floral and rosey notes may be provided by the utilization of beta-cyclohomocitral having the formula:

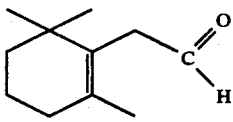

in perfume compositions, perfumed articles and colognes.

The beta-cyclohomocitral so useful, may be produced, preferably, by processes which comprises either (A) a reaction carried out in two steps, the first of which is an oxidation reaction of beta-ionone with either performic acid, peracetic acid or perpropionic acid to form beta-ionone enol ester and, secondly, hydrolyzing the beta-ionone enol ester in the presence of base (either aqueous or alcoholic) to form the desired beta-cyclohomocitral or (B) forming beta-cyclohomocitral by oxidizing beta-ionone with hydrogen peroxide in the presence of inorganic base.

More specifically, the process (A) comprises the steps of:

i. Reacting beta-ionone having the formula:

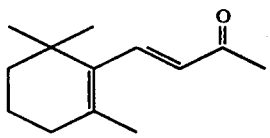

in the absence of dimethyl formamide with a peralkanoic acid having the formula:

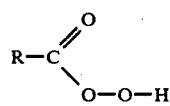

(wherein R is hydrogen, methyl or ethyl) to form beta-ionone enol ester having the formula:

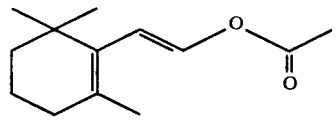

and not the expected beta-ionone epoxide having one of the formulae:

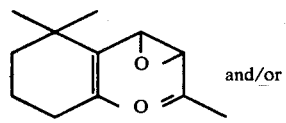

and/or

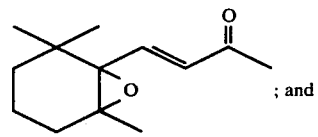

; and ii. hydrolyzing the beta-ionone enol ester in the presence of base (aqueous or alcoholic) to form beta-cyclohomocitral.

Insofar as the oxidation reaction is concerned:

A. where peralkanoic acids are used as the oxidizing agents, the reaction is preferably carried out in the presence of a buffer such as an alkali metal salt of a lower alkanoic acid or an alkali metal carbonate with a lower alkanoic acid such as propionic acid, acetic acid or formic acid with the following provisos:

i. The reaction is preferably carried out at temperatures of from 15° C up to about 75° C. Lower temperatures result in slower and less complete reaction and higher temperatures than 75° C result in lower yields of the desired product and significantly higher percentages of by-products. The most preferred temperature of reaction is 25° C.

ii. A slight molar excess (from 10 up to 15 percent) of peracetic acid gives a slightly higher yield of product. A large excess (about 200 percent), however, results in the formation of dihydroactinodiolide having the structure:

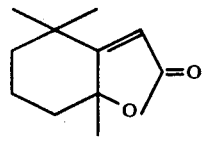

in about 30–35 percent yield when no buffer (e.g., potassium acetate) is present in the reaction mass;

iii. Where potassium carbonate is substituted for potassium acetate as a buffer, the yield of product obtained is substantially the same;

iv. On the other hand, a slightly lower yield of product is obtained by substituting sodium acetate for potassium acetate as the buffer;

v. Substitution of formic acid for acetic acid in the reaction mass gives rise to a lower yield of product;

vi. Any solvent inert to the action of peralkanoic acids may be used in this first oxidation reaction using alkanoic acids. For instance, the use of cyclohexane or chloroform as a solvent does not have an appreciable effect on the yield of product;

vii. Omission of the buffer (i.e., thus performing the reaction under strongly acidic conditions) results in an incomplete reaction, lower yield and greater quantity of by-product(s);

viii. The use of dimethyl formamide as solvent results in the exclusive formation of beta-ionone epoxide having the structure:

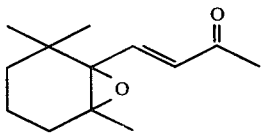

in about 70–75% yield and, accordingly, the presence of dimethyl formamide must be avoided;

ix. The use of monoperphthalic acid (performed in situ) from phthalic anhydride and hydrogen peroxide) yields beta-ionone epoxide in 60–70 percent yield. The use of perbenzoic acid in place of a peralkanoic acid has also been used to make beta-ionone epoxide R. Yves, et al., Helv. Chim. Acta, 29, 880 (1946).

It may be concluded that a peralkanoic acid such as peracetic acid in slight excess in the presence of a buffer system, preferably composed of acetic acid/potassium acetate is the preferred way to oxidize beta-ionone at 25° C to the corresponding enol acetate.

The beta-ionone enol ester preferably is hydrolyzed by 10 percent alkali metal hydroxide (e.g., potassium hydroxide, lithium hydroxide, sodium hyroxide) in admixture with 50 percent aqueous methanol, although other mild hydrolysis conditions (such as aqueous potassium carbonate, sodium carbonate or lithium carbonate solution) may also be used. As a result of the hydrolysis, beta-cyclohomocitral is formed.

The resultant reaction product, beta-cyclohomocitral may then be refined according to standard techniques, e.g., preparative gas chromatography, extraction, distillation and the like as further exemplified herein.

B. Where hydrogen peroxide (in the presence of inorganic base) is used as the oxidizing agent, the beta-cyclohomocitral is formed in one step from beta-ionone. The strength of hydrogen peroxide used is from about 10 percent up to about 50 percent. The inorganic base used may be an alkali metal hydroxide or alkali metal carbonate, such as sodium carbonate, potassium carbonate, lithium carbonate, sodium hydroxide, potassium hydroxide or lithium hydroxide; preferably sodium hydroxide. The mole ratio of hydrogen peroxide:beta-ionone is preferably from about 1.1:1 up to about 3:1.

The aforementioned processes are specific to beta-ionone. As further exemplified infra, when the reaction conditions of this process are applied to alpha-ionone, as opposed to beta-ionone, epoxide formation occurs and neither a substantial amount of enol acetate nor isomers of beta-cyclohomocitral are formed.

The 2,2,6-trimethyl-1-cyclohexen-1-ylacetaldehyde (or beta-cyclohomocitral) of our invention is capable of supplying, modifying, altering or enhancing certain fragrance notes usually lacking in many perfumery materials for example, petitgrain fragrances, floral fragrances and rose fragrances.

As used herein, the terms "alter" and "modify" in their various forms means "supplying or imparting fragrance character or note to otherwise bland, relatively odorless substances or augmenting the existing aroma characteristic where aroma is deficient in some regard or supplementing the existing aroma impression to modify its quality, character or odor."

As used herein, the term "enhance" is intended to mean the intensification (without alteration "in kind") of an aroma note or nuance which is already existant in the organoleptic impression of a given perfume composition or perfumed article or cologne.

The beta-cyclohomocitral and one or more auxiliary perfume ingredients, including, for example, alcohols, aldehydes, nitriles, esters, cyclic esters, and natural essential oils, may be admixed so that the combined odors of the individual components produce a pleasant and desired fragrance, particularly and preferably in floral fragrances, rosey fragrances, muguet fragrances or petitgrain fragrances. Such perfume compositions usually contain (a) the main note or the "bouquet" or foundation stone of the composition; (b) modifiers which round off and accompany the main note; (c) fixatives which include odorous substances which lend a particular note to the perfume throughout all stages of evaporation and substances which retard evaporation; and (d) topnotes which are usually low boiling fresh smelling materials.

In perfume compositions, the individual components which contribute its particular olfactory characteristics, but the over-all effect of the perfume composition will be the sum of the effects of each of the ingredients. Thus, the beta-cyclohomocitral can be used to alter the aroma characteristics of a perfume composition, for example, by utilizing or moderating the olfactory reaction contributed by another ingredient in the composition.

The amount of beta-cyclohomocitral of our invention which will be effective in perfume compositions depends on many factors, including the other ingredients, their amounts and the effects which are desired. It has been found that perfume compositions containing as little as 0.1% of beta-cyclohomocitral or less (e.g., 0.05%) can be used to impart earthy, woody, green, floral and rose notes to soaps, cosmetics and other products. In addition, it has been found that such perfume compositions containing as little as 0.05% of beta-cyclohomocitral can be used to alter, modify or enhance earthy, woody, green, floral and rose notes already present in soaps, cosmetics and other products. The amount employed can range up to 10% of the fragrance components and will depend on considerations of cost, nature of end product, the effect desired on the finished product and the particular fragrance sought.

The beta-cyclohomocitral is useful, taken alone or in perfume compositions as an olfactory component in detergents and soaps, space odorants and deodorants, perfumes, colognes, toilet water, bath preparations, such as bath oils and bath solids; hair preparations such as lacquers, brilliantines, pomades and shampoos; cosmetic preparations such as creams, deodorants, hand lotions and sun screens powders such as talcs, dusting powders, face powders and the like. As little as 1% of beta-cyclohomocitral will suffice to impart a green, earthy note to petitgrain formulations. As little as 4% of beta-cyclohomocitral will suffice to impart or enhance a rosey note in floral or muguet formulations. Generally, no more than 10% of beta-cyclohomocitral based on the ultimate end product is required in the perfume composition.

In addition, the perfume composition or fragrance composition of our invention can contain a vehicle or carrier for the beta-cyclohomocitral. The vehicle can be a liquid such as a non-toxic alcohol (e.g., ethanol), a non-toxic glycol (e.g., propylene glycol) and/or a non-toxic ester (e.g., diethyl phthalate or the like). The carrier can also be an absorbent solid such as a gum (e.g. gum arabic) or components for encapsulating the composition (such as gelatin).

Examples I–VIII, X, XIV, XVI, XXIII and XXIV, following, serve to illustrate the processes for producing beta-cyclohomocitral useful in our invention. Example IX, following, serves to illustrate the unworkability of this process where dimethyl formamide is used in the oxidation reaction of beta-ionone with peracetic acid. Example III, serves to illustrate the unworkability of the reaction where no buffer, e.g., sodium acetate is used. Examples XI–XIII, XVII–XIX and XXV–XXXIII illustrate the utility of beta-cyclohomocitral as claimed herein. Example XV illustrates the unworkability of the above process in forming alpha-ionone enol ester when operated on alpha-ionone rather than beta-ionone.

It will be understood that these Examples are illustrative and invention is to be considered restricted thereto only as indicated in the appended claims. All parts and percentages given herein are by weight unless otherwise specified.

EXAMPLE I

A. PRODUCTION OF BETA-IONONE ENOL ESTER FROM BETA-IONONE

Into a two liter reaction flask equipped with stirrer, thermometer, reflux condenser, addition funnel and cooling bath, the following materials are added:

i. Solution of 96 grams beta-ionone in 300 cc chloroform;
ii. 30 grams sodium acetate 95 Grams of 40 percent peracetic acid is then added with cooling, slowly at 10° C during a period of 1 hour. The reaction mass is stirred at 10° C for an additional hour and the solution is then allowed to slowly warm up to room temperature. The reaction mass is then poured into one liter of water and the resultant organic and aqueous phases are separated. The aqueous phase is then extracted with 100 cc of chloroform and the resultant organic phases are then bulked. The solvent is evaporated from the organic phase to yield 99.5 grams of an oil which is then chromatographed on 1,000 grams of alumina deactivated with 5% w/w water and eluted as follows:

| Fraction | Volume of Solvent | Quantity of Solute Eluted |
|---|---|---|
| 1 | 750 cc hexane | 8.0 grams |
| 2 | 500 cc hexane | 31.7 grams |
| 3 | 300 cc hexane | 13.5 grams |
| 4 | 250 cc hexane | 7.0 grams |
| 5 | 250 cc hexane | 1.9 grams |
| 6 | 250 cc hexane | 1.6 grams |
| 7 | 600 cc 25% diethyl ether-75% hexane | 15.6 grams |
| 8 | 600 cc diethyl ether | 15.3 grams |

Fractions 1 – 4 are composed mainly of beta-ionone enol ester.

The spectral data for a purified sample of this material obtained by preparative gas chromatography confirm the structure:

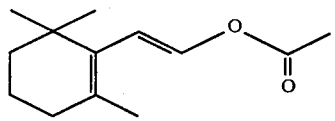

The mass spectrum of this compound has the following fragmentation pattern, in decreasing order of ion abundance: m/e 166 (100), 151 (81), 43 (30), 208 (30) (molecular ion) and 90 (18). The infrared spectrum shows the following characteristic absorption bands (cm$^{-1}$):

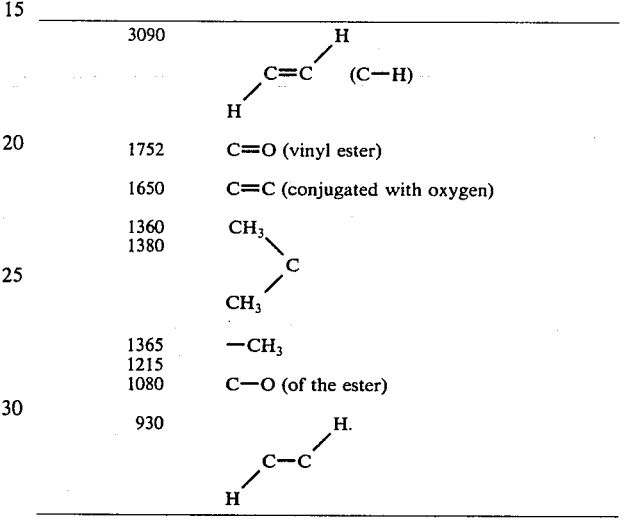

The NMR spectrum exhibits in CDCl$_3$ solution the following proton absorptions (chemical shifts in ppm):

| Ppm | Multiplicity | Assignment | No. of Protons |
|---|---|---|---|
| 1.00 | (s) | CH$_3$\C/CH$_3$ | 6H |
| 1.70 – 1.40 | (m) | —CH$_2$— | 7H |
| 1.76 | (s) | =C—CH$_3$ | |
| 2.00 | (t) | =C—CH$_2$— | 2H |
| 2.16 | (s) | CH$_3$—C(=O)—O— | 3H |
| 5.86 and 7.20 | (m) | Olefinic protons | 2H |

B. HYDROLYSIS TO FORM BETA-CYCLOHOMOCITRAL FROM BETA-IONONE ENOL ESTER

Beta-ionone enol ester (60.2 grams from Fractions 1–4 produced in Part A) is added to 280 cc of 10 percent potassium hydroxide solution (in a 50:50 water:methanol mixture at room temperature and stirred for a period of 30 minutes. Water 1,000 cc is added to the reaction mass which is then extracted with three 250 cc portions of diethyl ether. The combined ether extract is washed twice with two 100 cc portions of saturated sodium chloride solution, dried over anhydrous magnesium sulfate and evaporated to obtain 53 grams of an oil, beta-cyclohomocitral.

The crude beta-cyclohomocitral is distilled at 2mm Hg pressure and the fraction boiling at 70°–80° C is collected (35.6g).

Gas chromatographic analysis indicates that the product is about 85% pure. A pure sample of beta-cyclohomocitral is obtained by preparative chromatography (conditions: 10 feet × ¼ inch 10% carbowax 20M- packed stainless steel column at 220° C isothermal) and is characterised by the following analytical data as:

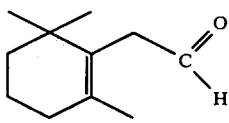

Mass spectral fragmentation, in decreasing order of ion abundance: m/e (%) 107(100); 29(93); 151(90); 41(88); 81(80); 95(67); 123(57); 55(45); 39(45); 27(43); 166(Mol ion)(35).

The infrared spectrum shows the following characteristic absorption bands (cm$^{-1}$):

| | |
|---|---|
| 2760 | $\overset{O}{\underset{\|}{C}}-H$ |
| 1770 | C=O (unconjugated) |
| 1380, 1360 | $CH_3\diagdown\underset{C}{}\diagup CH_3$ |
| 1375 | —$CH_3$ |

The NMR spectrum of the compound is in agreement with the above structure:

| (PPM) | Multiplicity | Assignment | No. of Protons |
|---|---|---|---|
| 0.98 | (s) | $CH_3\diagdown\underset{CH_3}{}\diagup C$ | 6H |
| 1.58 | (s) | —C—$CH_3$ | |
| 1.80 – 1.42 | (m) | —$CH_2$— | 9H |
| 2.00 | (t) | —C—$CH_2$—$\overset{O}{\underset{\|}{C}}$ | 2H |
| 9.58 | (t) | HC—O | 1H |

EXAMPLES II–X

The following examples, carried out using the same procedure as Example I, illustrate the results which occur when parameters of the oxidation reaction of betaionone with peracetic acid are varied, e.g., as to buffer, solvent, temperature presence of organic base and ratio of organic alkanoic acid to peracetic acid. The percentages given are obtained by gas chromatographic analyses of the reaction mixture after 30 minutes and do not represent yields of isolated material.

| Ex. No. | % Enol Ester | % Starting Material | % By-Products | Reactants and Reaction Conditions |
|---|---|---|---|---|
| II | 47 | 24 | 29 | Acetic acid- (150 cc) Sodium acetate (20 g) Beta-ionone- (30 g) 40% peracetic acid- (30 g) Temperature: 25° C. |
| III | 12 | 52 | 36 | Acetic acid- (150 g) Beta-ionone- (30 g) 40% peracetic acid- (30 g) Temperature: 25° C. |
| IV | 40 | 29 | 31 | Cyclohexane- (150 cc) Sodium acetate- (20 g) Beta-ionone- (30 g) 40% peracetic acid (30 g) Temperature: 25° C |
| V | 52 | 26 | 22 | Acetic acid- (150 cc) Potassium acetate (35 g) Beta-ionone- (30 g) 40% peracetic acid (30 g) Temperature: 25° C |
| VI | 31 | 30 | 39 | Formic acid- (150 cc) Potassium acetate- (50 g) Beta-ionone- (30 g) 40% peracetic acid (30 g) Temperature: 25° C |
| VII | 49 | 6 | 45 | Acetic acid- (150 cc) Potassium acetate- (35 g) Beta-ionone- (30 g) 40% Peracetic acid (33 g) Temperature: 25° C: |
| VIII | 36 | 21 | 43 | Acetic acid- (150 cc) Potassium acetate- (35 g) Beta-ionone- (30 g) 40% Peracetic acid- (33 g) Temperature: 50° C |
| IX | 0 | 9 | 91 Beta-ionone epoxide | Dimethyl formamide (150 cc) Beta-ionone- (30 g) 40% peracetic acid- (33 g) Temperature: 4 days at a temperature of 18° C. |
| X | 55 | 17 | 28 | Acetic acid- (450 cc) Potassium acetate- (105 g) Beta-ionone- (96 g) 40% peracetic acid- (105 g) Temperature: 25° C. |

EXAMPLE XI

PETITGRAIN FORMULATION

The following mixture is prepared:

| Ingredients | Parts by Weight |
| --- | --- |
| Betacyclohomocitral prepared according to the process of Example I | 20 |
| Linalool | 500 |
| Linalyl Acetate | 600 |
| Dimethyl Anthranilate | 2 |
| Terpineol | 20 |
| Geraniol | 30 |
| Terpinyl Acetate | 10 |
| Geranyl Acetate | 5 |
| Ocimene | 20 |
| Limonene | 50 |
| Pinene | 20 |
| Nerolidol | 10 |

The beta-cyclohomocitral imparts the green, earthy note of petitgrain required in such petitgrain formulations.

EXAMPLE XII

PERPARATION OF A SOAP COMPOSITION 100 grams of soap chips are mixed with one gram of the perfume composition of Example XI until a substantially homogeneous composition is obtained. The perfumed soap composition manifests an excellent petitgrain character with excellent green earthy notes.

EXAMPLE XIII

PREPARATION OF A DETERGENT COMPOSITION

A total of 100 grams of detergent powder is mixed with 0.15 grams of the perfume composition of Example XI, until a substantially homogeneous composition is obtained. This composition has an excellent petitgrain aroma with earthy green notes.

EXAMPLE XIV

PREPARATION OF BETA-CYCLOHOMOCITRAL BY $H_2O_2$ PEROXIDATION OF BETA-IONONE

To 20 grams of beta-ionone in 100 ml methanol is added 12 ml of 30% hydrogen peroxide. The solution is then cooled to 15° C and 18 ml 6 molar aqueous sodium hydroxide is added over a period of 30 minutes while maintaining the reaction mixture at 15° C. The reaction mixture is then allowed to warm up to 30° C and then maintained at 30° C with external cooling. The exotherm lasts approximately 60 minutes. Examination of the reaction product by gas chromatography indicates that some beta-ionone is still present. An additional 12 ml of 30% $H_2O_2$ and 18 ml 6 molar aqueous NaOH are added during a 30-minute period while maintaining the temperature at 25° C. Again an exotherm occurs lasting approximately 60 minutes during which time the temperature is maintained at 30° C. The reaction mass is then poured into excess water (500 ml) and the product is then extracted with three 150 ml portions of diethyl ether. The combined ether extracts are then washed with two 150 ml portions of saturated sodium chloride solution and dried over anhydrous $MgSO_4$. The solvent is then evaporated to yield 16.8 grams of a crude oil.

Examination of this material by gas chromatography indicates 22% beta-cyclohomocitral.

The desired product is obtained by preparative gas chromatography (conditions: 10 inch × ¼ inches 10% Carbowax 20 M packed stainless steel column at 220° C isothermal).

The structure is confirmed by IR, MS and NMR analyses as being:

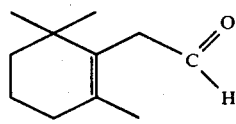

EXAMPLE XV

FORMATION OF ALPHA-IONONE EPOXIDE FROM ALPHA-IONONE

Into a 500 ml flask equipped with thermometer, stirrer, addition funnel and reflux condenser, the following materials are placed in the following order:

| Ingredients | Amount |
| --- | --- |
| Acetic Acid | 150 cc |
| Potassium Acetate | 35 grams |
| Alpha-Ionone | 30 grams |

33 grams of 40% peracetic acid is then added dropwise into the reaction mass with stirring at 25° C over a 45-minute period. The reaction mass exotherms for approximately one hour and is then allowed to remain at room temperature for a period of 15 hours.

The reaction mass is then poured into 500 ml water and the product is extracted with three 150 cc portions of diethyl ether. The ether extracts are combined and washed with two 100 cc portions of saturated sodium chloride solution and dried over anhydrous magnesium sulfate. The residual oil obtained after stripping the solvent, is distilled at 93°-99° C at 0.5 mm Hg pressure yielding 28.3 g of a clean colorless liquid.

IR, MS and NMR analyses confirm the fact that the product is alpha-ionone epoxide having the structure:

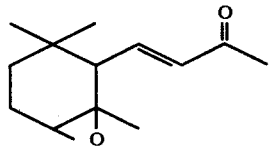

EXAMPLE XVI

PRODUCTION OF BETA-CYCLOHOMOCITAL

Into a two liter reaction flask equipped with stirrer, thermometer, addition funnel and cooling bath, the following materials are placed in the following order:

| Ingredients | Amounts |
| --- | --- |
| Acetic Acid | 450 cc |
| Potassium Acetate | 150 g |
| Beta-Ionone | 96 g |

105 grams of 40% peracetic acid is then added dropwise to the reaction mass with cooling while maintaining the reaction mass at 25° C+2° C over a two-hour period. The reaction mass is then stirred for an additional three-hour period (during the first hour a slight exotherm occurs) at 25° C.

The reaction mass is then poured into 1,000 ml water and the resultant product is extracted with three 300 cc volumes of diethyl ether. The ether extracts are combined and washed with two 150 cc portions of saturated sodium chloride solution. The resultant washed ether extract is then evaporated whereby 118 grams of residual oil is obtained.

400 cc of 10% potassium hydroxide solution (50:50 mixture, water:methanol) is prepared and the 118 grams of residual oil obtained above is added thereto. The resultant solution warms up slightly and is stirred for a period of 45 minutes.

The solution is then poured into 500 ml water and the product is extracted with three 250 cc portions of diethyl ether. The diethyl ether extract is then washed with two 200 cc portions of saturated sodium chloride solution, dried over anhydrous magnesium sulfate and evaporated to obtain 89 grams of a crude oil. This crude oil is distilled through a vigreaux distillation column at 70°–75 C and 2.0 mm Hg pressure to obtain 40.2 grams of a compound having the structure:

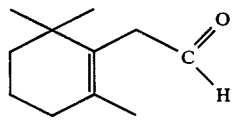

as confirmed by infrared (IR), nuclear magnetic resonance (NMR) and mass (MS) spectra.

EXAMPLE XVII

PREPARATION OF A COSMETIC-POWDER COMPOSITION

A cosmetic powder is prepared by mixing in a ball mill, 100 g of talcum powder with 0.25 g of beta-cyclohomocitral prepared according to Example XVI. It has an excellent woody, green, earthy aroma with a rosey nuance.

EXAMPLE XVIII

PERFUMED LIQUID DETERGENT

Concentrated liquid detergents with a woody, green, earthy odor are prepared containing 0.10%, 0.15% and 0.20% of beta-cyclohomocitral prepared according to Example XVI. They are prepared by adding and homogeneously mixing the appropriate quantity of beta-cyclohomocitral in the liquid detergent. The detergents all possess a woody, green, earthy fragrance with rosey nuances, the intensity increasing with greater concentrations of beta-cyclohomocitral.

EXAMPLE XIX

PREPARATION OF A COLOGNE AND HANDKERCHIEF PERFUME

Beta-cyclohomocitral prepared according to the process of Example XVI is incorporated in a cologne at a concentration of 2.5% in 85% aqueous ethanol; and into a handkerchief perfume at a concentration of 20% (in 95% aqueous ethanol). A distinct and definite woody, green, earthy fragrance with a rosey nuance is imparted to the cologne and to the handkerchief perfume.

EXAMPLE XX

PREPARATION OF A COLOGNE AND HANDKERCHIEF PERFUME

The composition of Example XI is incorporated in a cologne at a concentration of 2.5% in 85% aqueous ethanol; and into a handkerchief perfume at a concentration of 20% (in 95% aqueous ethanol). The use of the beta-cyclohomocitral in the composition of Example XI affords a distinct and definite strong petitgrain aroma with earthy and green notes to the handkerchief perfume and cologne.

EXAMPLE XXI

PREPARATION OF A SOAP COMPOSITION

One hundred grams of soap chips are mixed with one gram of beta-cyclohomocitral until a substantially homogeneous composition is obtained. The perfumed soap composition manifests an excellent woody, green and earthy aroma with a rosey nuance.

EXAMPLE XXII

PREPARATION OF A DETERGENT COMPOSITION

A total of 100 g of a detergent powder is mixed with 0.15 g of the beta-cyclohomocitral of Example XVI until a substantially homogeneous composition is obtained. This composition has an excellent woody, green, earthy aroma with a rosey nuance.

EXAMPLE XXIII

Perpropionic acid is prepared in the following manner. A mixture of the following materials:

| ( | 160 ml propionic acid<br>1 ml sulfuric acid (concentrated)<br>40 g 50% hydrogen peroxide | ) | Referred to hereinafter as "Mixture A" |
|---|---|---|---| is allowed to stand for 20 hours at room temperature.

The following reactants are placed in a 500 ml reaction flask equipped with a stirrer and cooling bath:

| ( | 140 ml propionic acid<br>75 g potassium acetate<br>60 g beta-ionone | ) | Referred to hereinafter as "Mixture B" |
|---|---|---|---|

To the stirred Mixture B is added, dropwise, Mixture A over a 60-minute period while maintaining the reaction temperature at 25° C ± 2° C by means of external cooling. When the addition is complete the reaction mixture is stirred for an additional 2 hours at 25° C.

The reaction mixture is then poured into 1,000 ml water and extracted twice with 250 ml portions of diethyl ether. The combined ether extracts are then washed first with water (three 100 ml portions) and then with a saturated solution of sodium chloride (150 ml). The ether solution is then dried over anhydrous magnesium sulfate and the solvent evaporated to yield 78 g of crude oil containing propionic acid as well as product. The crude product is hydrolyzed with a solution of 40 g potassium carbonate in 300 ml of water by heating under reflux, with stirring, for 15 hours. After cooling the organic layer is collected and the aqueous layer is extracted with 200 ml of diethyl ether. After combining the organic materials the solvent is removed by evaporation to yield 57.5 g of oil which is distilled to yield 19.5 g of beta-cyclohomocitral (Yield: 37%).

EXAMPLE XXIV

Performic acid is prepared in the following manner: 20 g 50% hydrogen peroxide and 80 ml of formic acid is admixed and the reaction mass is left at room temperature for 1.5 hours.

To a mixture consisting of 50 g of potassium acetate, 70 ml of acetic acid and 30 g of beta-ionone is added the preformed performic acid, prepared as described above, dropwise over a 30 minute period while maintaining the temperature of the stirred reaction mass at 25° C by means of external cooling. After the addition is complete, the mixture is stirred for a further 90 minutes at 25° C and is then poured into 800 ml of water. The product is extracted with two 200 ml portions of diethyl ether. The ether extracts are combined, washed with two 150 ml portions of saturated sodium chloride solution and then dried. Removal of the solvent by evaporation yields 32.5 g crude oil.

A gas chromatographic analysis of this material shows the following compositions:

(4%); (41%); (32%); Other products 23%

The following mixture is prepared:
20 g Lithium carbonate
200 ml 50% aqueous methanol To this is added the crude enol ester product obtained as described above. The mixture is then heated at 65°-70° C until substantially complete hydrolysis of the enol ester to beta-cyclohomocitral as indicated by gas chromatographic analysis. Water is added to the reaction mass which is then extracted with three 100 cc portions of diethyl ether. The combined ether extracts are washed twice with two 100 cc portions of saturated sodium chloride solution, dried over anhydrous magnesium sulfate and evaporated to obtain an oil, beta-cyclohomocitral.

The crude is distilled at 2 mm Hg pressure and the fraction boiling at 70°-80° C is collected.

Gas chromatographic analysis indicates that the product is about 85% pure. A pure sample of beta-cyclohomocitral is obtained by preparative chromatography and is characterised by the following analytical data as:

Mass spectral fragmentation, in decreasing order of ion abundance:

m/e (%) 107(100); 29(93); 151(90); 41(88); 81(80); 95(67); 123(57); 55(45); 39(45); 27(43); 166Mol ion) (35).

Infrared spectrum shows characteristic absorption at:

| 2760 cm$^{-1}$ | O‖C—H |
| 1770 cm$^{-1}$ | C=O (unconjugated) |
| 1380, 1360 cm$^{-1}$ | CH$_3$\C/CH$_3$ |
| 1375 cm$^{-1}$ | —CH$_3$ |

The NMR spectrum of the compound is in agreement with the above structure:

| (PPM) | Multiplicity | Assignment | Number of Protons |
| --- | --- | --- | --- |
| 0.98 | (s) | CH$_3$\C/CH$_3$ | 6H |
| 1.58 | (s) | =C—CH$_3$ | 9H |
| 1.80-1.42 | (m) | —CH$_2$— | |
| 2.00 | (t) | =C—CH$_2$—C(=O) | 2H |
| 9.58 | (t) | HC=O | 1H |

EXAMPLE XXV

MUGUET PERFUME FORMULATION

The following formulation is prepared:

| Ingredient | Parts by Weight |
| --- | --- |
| Indole | 2 |
| Hexyl Cinnamic Aldehyde | 400 |
| Rhodinol | 40 |
| Terpineol | 30 |
| Tetrahydro-3-pentyl-pyran-4-ylacetate | 10 |
| Cinnamyl Acetate | 5 |
| 4(4-hydroxy-4-methylpentyl)-3-cyclohexene-1-carboxaldehyde | 20 |
| Hydroxy Citronellal | 280 |
| Violet Leaves Absolute (10% in diethyl phthalate | 4 |
| Phenyl ethyl alcohol | 45 |
| Tetrahydromuguol | 20 |
| n-Undecylenic Aldehyde (10% in diethyl phthalate | 5 |
| n-decanal (10% in diethyl phthalate) | 5 |
| n-nonanal (10% in diethyl phthalate) | 4 |
| Benzyl acetate | 10 |
| Dimethyl Phenyl Ethyl Carbinol | 10 |
| p-t-butyl-alpha-methyl-hydrocinnamic aldehyde | 4 |
| Methyl Cinnamate (10% in diethyl phthalate) | 2 |
| Benzyl Cinnamate | 4 |
| | 940 |

40 parts by weight of a 10% solution of beta-cyclohomocitral (prepared according to the process of Example XXIV) in diethyl phthalate is added to the above formulation. The beta-cyclohomocitral improves the floral nuance of this formulation by significantly increasing the rosey character of this muguet fragrance.

In another experiment, 80 parts by weight of a 10% solution of beta-cyclohomocitral (prepared according to the process of Example XXIV) in diethyl phthalate is added to the above muguet formulation. The beta-cyclohomocitral markedly improves the floral nuance of the compound by increasing, significantly, its rosey character.

EXAMPLE XXVI

FLORAL PERFUME FORMULATION

The following floral formulation is prepared:

| Ingredients | Parts by Weight |
| --- | --- |
| Lavender Barreme | 60 |
| Linalool | 370 |
| Phenyl Ethyl Alcohol | 500 |
| Benzyl acetate | 120 |
| Linalyl Acetate | 520 |
| Hydroxy Citronellal | 600 |
| 4(4-hydroxy-4-methylpentyl)-3-cyclohexene-1-carboxaldehyde | 100 |
| Eugenol | 230 |
| Alpha isomethyl ionone | 1000 |
| Sandalwood Oil | 120 |
| Ylang Oil | 50 |
| Musk Ambrette | 100 |
| Benzyl Salicylate | 1350 |
| 6-oxa-1,1,2,3,3,8-hexametal-2,3,5,6,7,8-hexahydro-1H-Benze[f]-indene prepared according to the process of Example XV of U.S. patent 3,360,530 (50% in diethyl phthalate) | 550 |
| 4'-t-butyl-2',6'-dimethyl-3',5'-dinitro acetophenone | 450 |
| p-t-butyl-alpha-methyl-hydrocinnamic aldehyde | 20 |
| diethyl phthalate | 90 |
| | 6230 |

35 parts by weight of a 10% solution (diethyl phthalate) of beta-cyclohomocitral (prepared according to the process of Example XXIV) is added to this formulation. The beta-cyclohomocitral creates a rosey effect in this floral formulation. The rosey effect is significantly improved by adding another 35 parts by weight of 10% (in diethyl phthalate) of beta-cyclohomocitral. The rosey effect is further improved slightly by addition of another 35 parts by weight of 10% (in diethyl phthalate) of beta-cyclohomocitral produced according to Example XXIV.

EXAMPLE XXVII

PREPARATION OF A SOAP COMPOSITION 100 grams of soap chips are mixed with one gram of the perfume composition of Example XXV until a substantial homogeneous composition is obtained. The perfumed soap composition manifests an excellent muguet character with excellent floral notes.

EXAMPLE XXVIII

PREPARATION OF A DETERGENT COMPOSITION

A total of 100 grams of detergent powder is mixed with 0.15 grams of the perfume composition of Example XXV, until a substantially homogeneous composition is obtained. This composition has an excellent muguet aroma with floral notes.

EXAMPLE XXIX

PREPARATION OF A COLOGNE AND HANDKERCHIEF PERFUME

The composition of Example XXVI is incorporated in a cologne at a concentration of 2.5% in 85% aqueous ethanol; and into a handkerchief perfume a concentration of 20% (in 95% aqueous ethanol). A distinct and definite strong rosey aroma is imparted to the cologne and to the handkerchief perfume.

EXAMPLE XXX

ROSE FRAGRANCE

The following rose formulation is prepared:

| Ingredients | Parts by Weight |
| --- | --- |
| Rhodinol | 270.0 |
| Nerol | 90.0 |
| Linalool | 30.0 |
| Terpineol | 30.0 |
| Phenyl ethyl alcohol | 12.0 |
| Terpinenol | 5.0 |
| Linalyl acetate | 1.5 |
| Citronellyl acetate | 15.0 |
| Geranyl acetate | 10.0 |
| Eugenol | 30.0 |
| Citral | 15.0 |
| Phenyl ethyl acetate | 20.0 |
| Rose Oxide | 8.0 |
| Guaicol | 30.0 |
| Citronellyl | 93.0 |
| Neryl acetate | 3.0 |
| Clove bud oil | 1.0 |
| Cadinene | 2.0 |
| Guaiene | 1.0 |
| French gum turpentine | 12.0 |
| Alpha pinene | 1.0 |
| Myrcene purified | 5.0 |
| Linonene | 2.0 |
| p-cymene | 1.0 |
| | 687.5 |

30 parts by weight of a 0.1% solution of beta-cyclohomocitral (in diethyl phthalate) is added to a portion of the foregoing formulation. The formulation which contains the beta-cyclohomocitral is a much brighter rose top note as compared to the formulation without said beta-cyclohomocitral.

EXAMPLE XXXI

PREPARATION OF A SOAP COMPOSITION 100 grams of soap chips are mixed with 1 gram of the perfume composition of Example XXX until a substantially homogeneous composition is obtained. The perfumed soap composition manifests an excellent rose character.

EXAMPLE XXXII

PREPARATION OF A DETERGENT COMPOSITION

A total of 100 grams of detergent powder is mixed with 0.15 grams of the perfumed composition of Example XXX until a substantially homogeneous composition is obtained. This composition has an excellent rose aroma.

EXAMPLE XXXIII

PREPARATION OF A COSMETIC POWDER COMPOSITION

A cosmetic powder is prepared by mixing in a ball mill, 100 grams of talcum powder with 0.25 grams of the perfumed formulation of Example XXX. The resulting powder has an excellent rosey aroma.

What is claimed is:

1. A process for altering or enhancing the organoleptic properties of a soap which comprises adding thereto an aroma altering, modifying or enhancing amount of a composition comprising 2,6,6-trimethyl-1-cyclohexen-1-ylacetaldehyde having the structure:

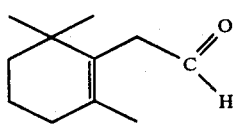

2. A soap comprising an aroma altering, modifying or enhancing amount of 2,6,6-trimethyl-1-cyclohexen-1-ylacetaldehyde having the structure:

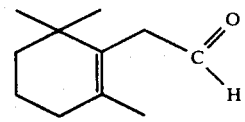

and a soap base.

3. The soap composition of claim 2 consisting essentially of 2,6,6-trimethyl-1-cyclohexen-1-ylacetaldehyde and a soap base, the ratio of 2,6,6-trimethyl-1-cyclohexen-1-ylacetaldehyde:soap being 1:100.

* * * * *

UNITED STATES PATENT OFFICE
CERTIFICATE OF CORRECTION

Patent No. 4,055,506     Dated October 25, 1977

Inventor(s) Alan Owen Pittet; Erich Manfred Klaiber; Manfred Hugo Vock; Edward J. Shuster; Joaquin Vinals It is certified that error appears in the above-identified patent and that said Letters Patent are hereby corrected as shown below:

Column 1, line 50: The structure

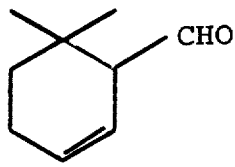   should read   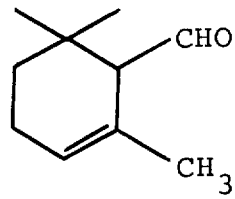

Column 4, line 15: the structure

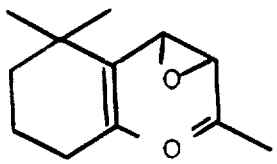   should read   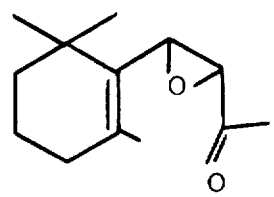

UNITED STATES PATENT OFFICE
CERTIFICATE OF CORRECTION

Patent No. 4,055,506        Dated October 25, 1977

Inventor(s) Alan Owen Pittet; Erich Manfred Klaiber; Manfred Hugo Vock; Edward J. Shuster; Joaquin Vinals It is certified that error appears in the above-identified patent and that said Letters Patent are hereby corrected as shown below:

Column 8, line 32:   the structure

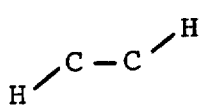            should read            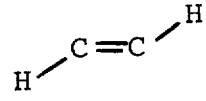

Column 9, line 48:   the structure

HC—O            should read   H—C=O

Column 9, line 55: the term "betaionone" should read
--- beta-ionone ---

Signed and Sealed this

Twentieth Day of June 1978

[SEAL]

Attest:

RUTH C. MASON
Attesting Officer

DONALD W. BANNER
Commissioner of Patents and Trademarks